United States Patent [19]

Ellion et al.

[11] Patent Number: 4,490,972
[45] Date of Patent: Jan. 1, 1985

[54] HYDRAZINE THRUSTER

[75] Inventors: M. Edmund Ellion, Arcadia; Philip A. Donatelli, Marina del Rey, both of Calif.

[73] Assignee: Hughes Aircraft Company, El Segundo, Calif.

[21] Appl. No.: 362,937

[22] Filed: Mar. 29, 1982

[51] Int. Cl.³ .............................. F02K 1/40; F02K 7/02
[52] U.S. Cl. .................................. 60/39.462; 60/200.1; 60/218
[58] Field of Search ............... 60/218, 219, 39.462, 60/200.1; 149/36

[56] References Cited

U.S. PATENT DOCUMENTS

| | | |
|---|---|---|
| 2,975,588 | 3/1961 | Smith . |
| 3,431,733 | 3/1969 | Hamrick . |
| 4,027,476 | 6/1977 | Schmidt .................................. 60/218 |
| 4,069,664 | 1/1978 | Ellion et al. ...................... 60/39.462 |

FOREIGN PATENT DOCUMENTS

| | | |
|---|---|---|
| 2455184 | 11/1980 | France . |
| 1470664 | 4/1977 | United Kingdom . |
| 2010406 | 6/1979 | United Kingdom . |

Primary Examiner—Leland A. Sebastian
Attorney, Agent, or Firm—G. J. Woloson; W. J. Benman, Jr.; A. W. Karambelas

[57] ABSTRACT

Hydrazine thruster 10 is mounted on support flange 14 with thermal mass 12 therebetween. The thermal mass 12 extracts sufficient heat so that the incoming hydrazine in inlet line 20, as well as that portion of the decomposition catalyst contained within the inlet portion of chamber housing 24, is maintained at a temperature below the hydrazine saturation temperature at the pressure within chamber housing 24 so that at any on/off operating duty cycles for that installation, the hydrazine is discharged into the catalyst in chamber housing 24 as liquid.

12 Claims, 6 Drawing Figures

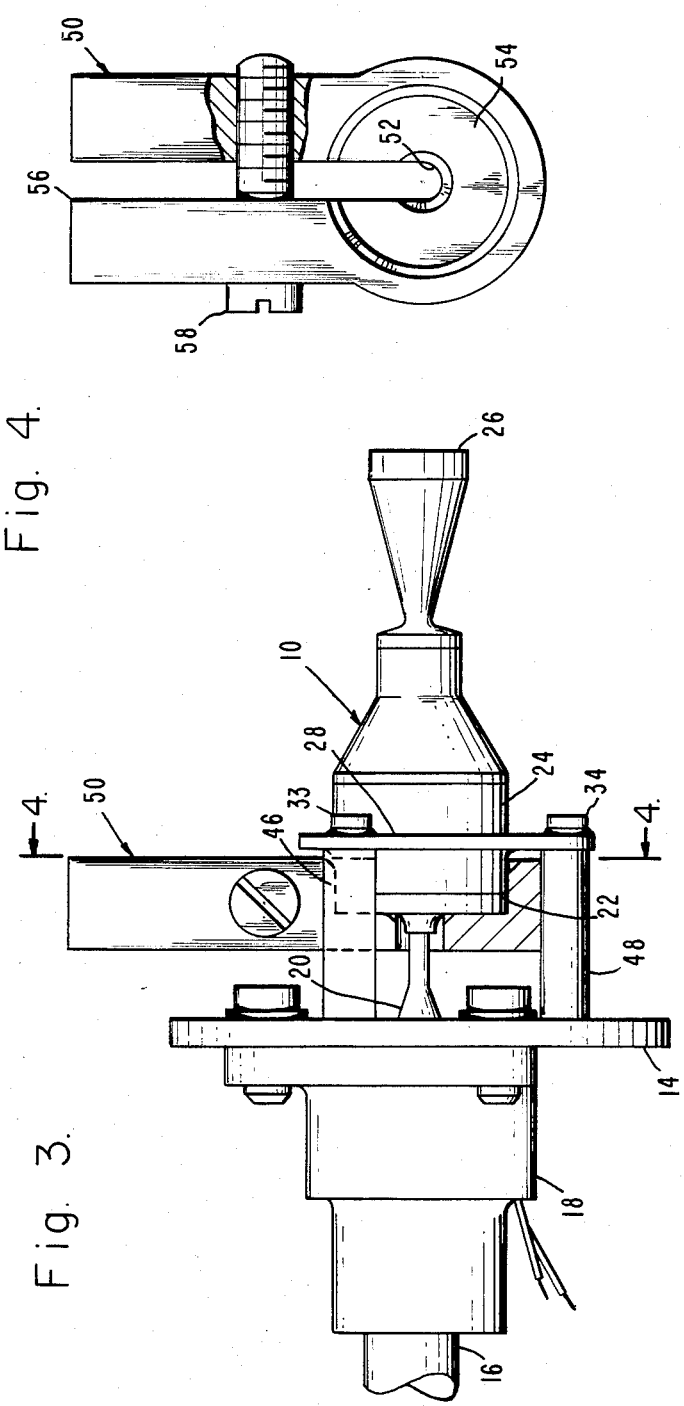

HYDRAZINE THRUSTER

TECHNICAL FIELD

This invention is directed to a hydrazine thruster, and particularly to apparatus to control the temperatures of hydrazine as well as the decomposition catalyst located at the nozzle by which the hydrazine is discharged into the hydrazine decomposition catalyst bed.

BACKGROUND OF THE INVENTION

Hydrazine is a thermally unstable compound that can decompose exothermically under certain conditions to produce nitrogen gas, hydrogen gas and if not totally decomposed, some ammonia vapor. In a well designed thruster, such as disclosed in Ellion and Donatelli, U.S. Pat. No. 4,069,664, the hydrazine decomposition is controlled as it flows over the catalyst. The result of this controlled, orderly process is that the hydrazine decomposes slowly as it flows over the catalyst towards the exit nozzle, generating heat at a relatively steady pressure. In an old, loose catalyst bed, the hydrazine does not flow smoothly over the catalyst grains, but rather forms puddles. Portions of these relatively large, stagnant puddles of hydrazine vaporize and then explosively thermally decompose the entire puddle, causing large pressure excursions and further degradation of the catalyst. The same pressure excursions resulting from this thermal explosive autodecomposition may occur in a new bed when the area where the hydrazine enters the bed becomes too hot for some on/off firing cycles. A discussion of the criteria involved in that process is found in patent application Ser. No. 32,074, filed Apr. 23, 1979, by M. Edmund Ellion, now U.S. Pat. No. 4,324,096.

SUMMARY OF THE INVENTION

In order to aid in the understanding of this invention, it can be stated in essentially summary form that it is directed to a method and apparatus for controlling the temperatures of the liquid hydrazine as well as the dissociation catalyst located in the area next to the inlet of a hydrazine dissociation catalyst bed so that the temperatures are below the saturation temperature corresponding to the pressure within the decomposition chamber, to minimize explosive autodecomposition of the hydrazine.

It is a purpose and advantage of this invention to provide a hydrazine thruster which has increased operating lifetime by preventing explosive autodecomposition of the hydrazine in the catalyst bed by controlling the inlet temperature of the liquid hydrazine and surrounding catalyst.

It is another purpose and advantage of this invention to provide a hydrazine thruster which has a stable chamber pressure during firing to minimize catalyst breakdown and extend the operating lifetime of the thruster for any on/off firing modes.

Other purposes and advantages of this invention will become apparent from a study of the following portion of the specification, the claims and the attached drawings.

BRIEF DESCRIPTION OF THE DRAWINGS

FIG. 3 is a side elevational view, with parts broken away and parts taken in section of a hydrazine thruster assembly of another preferred embodiment of the thermal control structure of this invention.

FIG. 4 is an end elevational view, with parts broken away and parts taken in section, of the thermal control structure of FIG. 3, as seen generally along line 4—4 of FIG. 3.

DETAILED DESCRIPTION OF THE INVENTION

Figure 1:
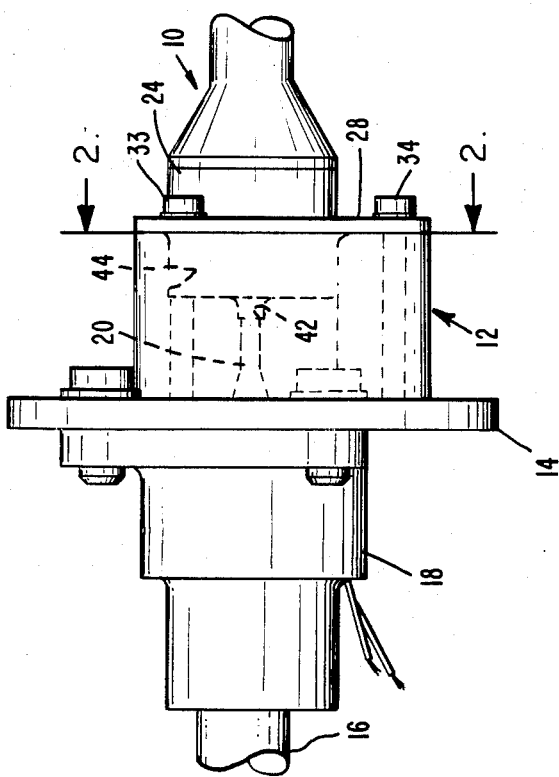
FIG. 1 is a side elevational view of a hydrazine thruster assembly, including a first preferred embodiment of the thermal control structure of this invention.

FIG. 1 illustrates hydrazine thruster 10 as carrying thermal control structure 12 in accordance with the first preferred embodiment of the hydrazine thruster of this invention. Flange 14 is a mounting flange which may be part of the main structure or may be a flange which mounts upon the main structure. The main structure may be a spacecraft, or it may be any structure to which thrust is to be applied. Liquid hydrazine inlet line 16 brings liquid hydrazine under pressure from a source thereof. Valve 18 controls the flow of liquid hydrazine therethrough. As indicated, valve 18 is connectable to an electric signal source for control of the on/off function of the valve. The outlet from valve 18 is through inlet line 20 connected to the inlet flange (corresponding to element 22 of FIG. 3) of thruster 10. The details of the internal construction of thruster 10, including its catalyst chambers and injection nozzles, are shown in the above mentioned M. E. Ellion and P. A. Donatelli, U.S. Pat. No. 4,069,664 and M. E. Ellion, patent application Ser. No. 32,074 now U.S. Pat. No. 4,324,096. Those disclosures are incorporated herein in their entirety by this reference.

Figure 5:
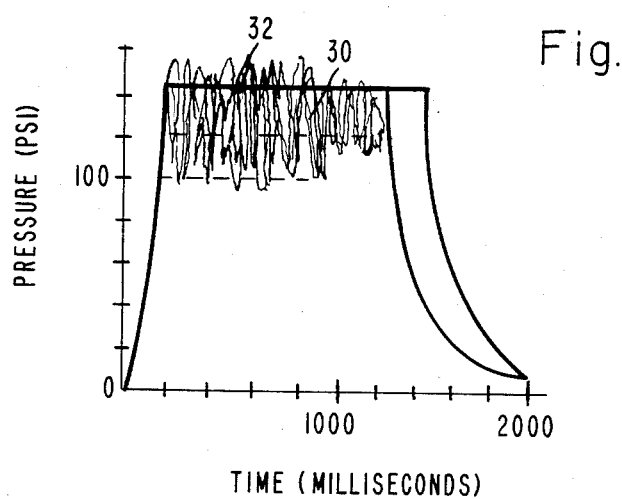
FIG. 5 shows oscilloscope displays of chamber pressure versus time of the disclosed hydrazine thruster, with and without the thermal control structure in accordance with this invention.

Thruster 10 has chamber housing 24 which has the dissociation catalyst therein and at its outlet it carries thrust nozzle 26. Thruster flange 28 is carried on the exterior housing 24 and in the past has been mounted on stand-offs as is shown in M. E. Ellion, patent application Ser. No. 32,074 now U.S. Pat. No. 4,324,096. Under those conditions, cyclic duty of the thruster results in the characterization shown in FIG. 6. The data points marked with an X indicate rough pressure in the catalyst chamber. The data points indicated with a dot show smooth pressure during the firing cycle. The rough pressure surges indicated at 30 in FIG. 5 are illustrative of the data points marked with the X while the straight pressure line 32 is indicative of the data points marked with the dot. In FIG. 5, the abscissa is the pressure in the chamber at 20 psi per division and the ordinate is time at 200 milliseconds per division. The roughness in chamber pressure exceeds 30% when in the rough firing condition. When operating in the smooth pressure mode, the line 32 represents a plurality of firing pulses with the pressure traces superimposed.

In order to maintain smooth firing as indicated by line 32, the temperature of the incoming hydrazine to the chamber housing 24, as well as the surrounding catalyst, is controlled. When the incoming hydrazine is maintained as a liquid while in the injector and as it enters the catalyst bed, the hydrazine cannot decompose if its temperature is below the hydrazine saturation temperature corresponding to the pressure in the bed. Vaporization of the hydrazine liquid is necessary before exothermic decomposition is possible. The basic principle of this invention is to control the hydrazine temperature so that it enters the bed below its saturation temperature corresponding to the pressure within the decomposition chamber, and also to maintain the catalyst in the area also below that temperature. This maintains the hydrazine as a liquid while within the injector and as it flows into the catalyst bed. The catalyst in this area also being maintained below the hydrazine saturation temperature allows the fluid to spread smoothly through the bed to result in controlled decomposition. The result is that any puddles of hydrazine will spread out smoothly before the hydrazine starts the rapid exothermic decomposition.

Hydrazine cannot decompose exothermically until it is first transitioned from a liquid to a vapor. For most injector designs there are void spaces within chamber housing 24, where the catalyst contacts the injector. These void spaces allow a sufficient amount of liquid hydrazine to collect in the void. Heat transfer from the hot catalyst can then decompose all of it at one time to produce explosive decomposition and resultant pressure pulses. The temperature of 300° F. is a conservative lower limit of hydrazine temperature which is required to permit rapid autodecomposition. The tendency for explosive decomposition varies exponentially with temperature in an Arrhenius relationship. If the hydrazine liquid is sufficiently heated to permit a portion of it to vaporize before it can enter the catalyst bed, the vapor liquid mixture will explosively autodecompose. Even with specially designed injectors, the explosive autodecomposition will occur after substantial operation has loosened the catalyst bed to permit voids to form therein if the surrounding catalyst temperature is above the hydrazine saturation temperature. With injectors that do have voids in the region between the injector and the catalyst, there is a very limited operating range with regard to on/off time as well as life time as discussed in patent application Ser. No. 32,074, U.S. Pat. No. 4,324,096.

Figure 2:
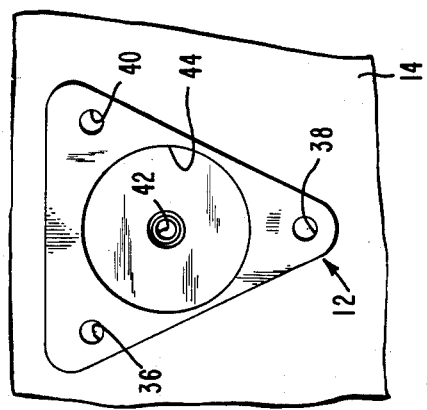
FIG. 2 is an end elevational view, as seen along the line 2—2 of FIG. 1, with the thruster removed.

It is the thermal control structure 12 of this invention that controls the temperatures of the hydrazine and the catalyst at the inlet to the catalyst bed. Thermal control structure 12 is a high conductivity solid mass which closely fits between flanges 14 and 28, and is clamped between those flanges by the three thruster mounting bolts, of which two are seen at 33 and 34. As is seen in FIG. 2, the thermal control structure 12 is a triangular shaped solid metallic mass with bolt holes 36 and 38 therethrough, respectively, for bolts 33 and 34, and another bolt hole 40 for the mounting bolt hidden in FIG. 1. Central opening 42 permits the inlet line 20 to pass through the center of the thermal control structure mass and recess 44 receives both the inlet flange and the inlet portion of thruster 10. Thus, the substantial mass of structure 12 is conductively coupled to flanges 14 and 28 and to the thruster's inlet portion to act both as a thermal sink to receive heat from the inlet portion of the thruster and from flange 28 and to more slowly dissipate this heat into flange 14 and then to the incoming hydrazine and the main frame structure. Thermal control structure mass 12 is solid except for the required openings for inlet line 20, for the inlet portion and the inlet flange, and for the bolts which secure the structure together. A maximum thermal sink and a maximum conductive area is thus presented by this structure. This embodiment is effective when the hydrazine can absorb some of the heat and still remain below its saturation temperature. In the event it is necessary to cool both the hydrazine and the catalyst, embodiment illustrated in FIGS. 3 and 4 is preferred.

FIGS. 3 and 4 show a similar structure including thruster 10 mounted on flange 14 which represents the main frame or a subframe of the device on which thruster 10 is mounted. Thruster 10 is supplied with liquid hydrazine through supply line 16 and the hydrazine flow is controlled by liquid hydrazine valve 18. The liquid hydrazine passes through inlet line 20 which is secured to inlet flange 22 mounted on chamber housing 24. Thrust nozzle 26 discharges hot gases which result from the liquid hydrazine dissociation to produce thrust.

In order to control the temperature of the catalyst, as well as the hydrazine in inlet line 20, and in the injector nozzles, in order to maintain the hydrazine liquid, thermal control of the chamber housing 24 is necessary. As indicated above, in the preferred embodiment of FIG. 1, the thermal conduction mass 12 was supplied to control this temperature by transferring heat from the catalyst to the flange and then to the incoming hydrazine and main frame structure. In the preferred embodiment of FIG. 3, thruster flange 28 is mounted on three stand-offs with respect to flange 14. Two of the stand-offs are shown at 46 and 48 in FIG. 3. Mounting bolts 33 and 34 have their heads on thruster flange 28, their shanks pass through the tubular stand-offs 46 and 48, and their threads engage in suitable threaded holes in flange 14. The size and material of the mounting bolts and stand-offs is chosen to transfer the correct amount of heat to flange 14, for heating of the spacecraft. If there is more heat available which must be disposed of to prevent vaporization of the hydrazine, it must be disposed of in another way. In the preferred embodiment of FIG. 3, thermal control structure 50 is in the form of a thermal mass which is clamped over inlet flange 20 and the inlet portion end of chamber housing 24. Opening 52 accepts inlet line 20 and recess 54 accepts inlet flange 22 and the inlet portion of chamber housing 24, see FIGS. 3 and 4. The mass of thermal control structure 50 is a generally rectangular mass which extends away from the center line of thruster 10 in a direction where it does not contact the stand-offs 46 and 48 which support the thruster. The structure 50 has a central slot 56 and a clamp screw 58. When the clamp screw is tightened, slot 56 is closed down and the thermal control structure is clamped on the inlet portion of the thruster in good thermal relationship in order to act as a thermal conductor. The heat entering into the thermal mass 50 cools the incoming hydrazine and that portion of the catalyst located within the inlet portion and is conducted by a mechanical high conductivity attachment into the spacecraft structure and then radiated to space.

Figure 6:
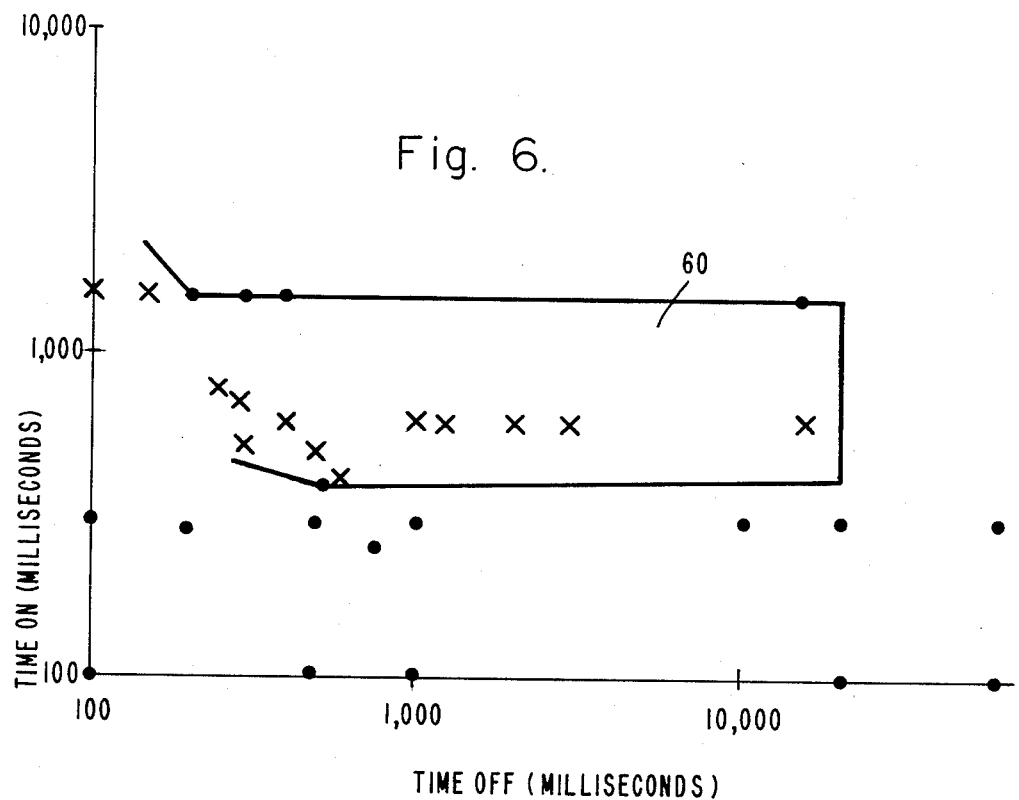
FIG. 6 shows test results of a conventional hydrazine thruster illustrating the typical acceptable and unacceptable operational duty cycle regimes.

FIG. 5 shows extreme pressure fluctuations and rough pressure surges 30 for a similar thruster operating with an on/off duty cycle within the rough firing zone 60, see FIG. 6. The principle reason for the oscillation is that a mass of hydrazine liquid forms around the hot catalyst. Because of the heat that was transferred to the hydrazine from the hot catalyst, some of the liquid vaporizes and, since this vapor exceeded the autodecomposition temperature, it explosively decomposed all of the surrounding hydrazine, causing the chamber pressure to rise. The higher pressure raised the value of the incoming hydrazine saturation temperature, therefore preventing vaporization. Since there was no new vapor, there was no explosive decomposition. There follows a progressive, orderly, decomposition, since there no longer is a pool of hydrazine. The lower chamber pressure results from less hydrazine decomposition. This lower pressure allowed the incoming hydrazine to once again exceed the saturation temperature and once again vaporize, resulting again in an explosive decomposition. This cycle resulted in the wild pressure fluctuation shown at 30. When the thermal control structure 12 or 50 was supplied, heat was removed therethrough, thus lowering the temperature and consequently eliminated the explosive decomposition and the chamber pressure became smooth as indicated by line 32.

In summary, hydrazine must vaporize and must be at a temperature exceeding about 300° F. before it can rapidly decompose, and any liquid present will add a large source of energy in a small volume. Both conditions are required for the rough pressure surges to occur. A well designed thruster allows orderly flow of hydrazine, starting as liquid and then vaporizing through the catalyst bed to produce a smooth, steady operating hydrazine dissociation process on the catalyst in the decomposition chamber. For an old, loose catalyst bed (or for most injectors even with a new bed) if the injected hydrazine and catalyst temperatures are sufficiently high so that a sufficiently large mass of hydrazine vapor can form in the injector-catalyst region along with some liquid, explosive decomposition will occur. This vapor mass will autodecompose explosively, supplying the energy to vaporize the large mass of liquid and results in further large energy release, causing large pressure surges that damage the catalyst and severely limit the useful life of the thruster. To prevent these undesirable pressure surges, it is only necessary to prevent the hydrazine from forming vapor liquid masses in the catalyst voids that exceed the 300° F. This can be accomplished by preventing the hydrazine liquid from contacting the catalyst whose temperature exceeds its saturation temperature until it is safely flowing in the catalyst bed. In accordance with this invention, the liquid hydrazine is prevented from reaching its saturation temperature in the injector and the catalyst in the area of the incoming hydrazine is cooled to a temperature below the hydrazine saturation point. The saturation temperature is the boiling temperature at that pressure. It must be noted that the injector can be above the saturation temperature as long as insufficient heat is transferred from the injector to the liquid hydrazine to cause vaporization. The critical wall temperature that will cause 100% vaporization and results in pressure surges can be calculated from the following heat balance relationship:

$$q = hA(T_w - T) = w[C(T_{sat} - T_{in}) + \lambda]$$

where:
q = heat transfer rate per unit area
h = heat transfer coefficient (calculate by Sieder-Tate Equation and boiling heat transfer as given in standard heat transfer texts)
A = heat transfer area
$T_w$ = injector wall temperature
T = hydrazine temperature in the injector
w = mass flow rate of hydrazine
C = specific heat of hydrazine
$T_{sat}$ = saturation temperature of hydrazine at chamber pressure
$T_{in}$ = hydrazine temperature entering the injector
$\lambda$ = latent heat of vaporization for hydrazine at chamber pressure.

Using this relationship and employing the data for a typical injector, such as shown in FIGS. 1 and 3 without their respective thermal control structures, the critical wall temperature is found to be almost 1000° F. Since not all of the incoming hydrazine must be vaporized to cause explosive decomposition, wall temperature below this calculated value could vaporize sufficient hydrazine to cause explosive decomposition and pressure surges. As a result, it is desirable to be conservative and limit the injector and surrounding catalyst temperatures to the saturation temperature, thus insuring no vaporization until the hydrazine is flowing smoothly in the bed.

The thermal control structure 12 transfers heat from the catalyst in the area of the incoming hydrazine to both the main structure and to the hydrazine. The thermal control structure 50 transfers heat from both the hydrazine and the catalyst in the entrance area to the main structure.

The thermal control structures 12 and 50 are thus respectively employed to maintain the incoming liquid hydrazine and surrounding catalyst below the saturation temperature. The type of thermal control structure 12 or 50 is chosen so that with the desired on/off operating ratio, the temperatures remain in the safe region for smooth thruster operation. For any injector design, the thermal control structure 12 or 50 lowers the injector and surrounding catalyst temperatures to conservative values below the saturation temperature corresponding to the chamber pressure, to result in a long operating life at any firing duty cycle.

This invention has been described in its presently contemplated best mode and it is clear that it is susceptible to numerous modifications, modes and embodiments within the ability of those skilled in the art and without the exercise of the inventive faculty. Accordingly, the scope of this invention is defined by the scope of the following claims.

What is claimed is:

1. A hydrazine hot gas producer comprising:
a hydrazine chamber housing for containing hydrazine dissociation catalyst therein, said chamber including an inlet portion;
an outlet structure connected to said chamber for discharging from said chamber the hot gas products of hydrazine exothermic dissociation;
hydrazine supply means connected to said inlet portion of said chamber for supplying hydrazine to be exothermically decomposed in said chamber; and
a thermal control structure connected to said inlet portion of said chamber for receiving from said inlet portion heat which is generated by exothermic decomposition of hydrazine within said chamber so that both the incoming hydrazine supplied by said hydrazine supply means and that portion of the catalyst within said inlet portion are at temperatures less than the saturation temperature for hydrazine at the pressure of said chamber.

2. The hydrazine hot gas producer of claim 1 wherein said thermal control structure is a heat sink for receiving heat from said inlet portion of said chamber housing for use as a transient control.

3. The hydrazine hot gas producer of claim 2 wherein said hydrazine supply means cyclically supplies hydrazine to said chamber housing so that cyclic thermal decomposition takes place within said chamber housing.

4. The hydrazine hot gas producer of claim 3 wherein said thermal control structure comprises a metallic heat sink which is clamped onto said inlet portion of said chamber housing.

5. The hydrazine hot gas producer of claim 3 wherein there is support means for supporting said chamber housing and said heat sink is clamped between said chamber housing and said support means in order to transfer heat from the inlet-portion catalyst to the incoming hydrazine and also to said support means.

6. The hydrazine hot gas producer of claim 3 wherein there is support means for supporting said chamber housing and said heat sink is clamped between said chamber housing and said support means in order to transfer heat from the incoming hydrazine and from the inlet-portion catalyst to said support means.

7. The hydrazine hot gas producer of claim 1 wherein said outlet structure is a thrust nozzle so that the structure is a thruster whereby thrust is produced when hydrazine is dissociated.

8. The hydrazine thruster of claim 7 wherein said thermal control structure is a heat sink for receiving heat from said inlet portion of said chamber housing.

9. The hydrazine thruster of claim 7 wherein said hydrazine supply means cyclically supplies hydrazine to said chamber housing so that cyclic thermal decomposition takes place within said chamber housing and wherein said thermal control structure comprises a metallic heat sink which is clamped onto said inlet portion of said chamber housing.

10. The hydrazine thruster of claim 9 wherein there is support means for supporting said chamber housing of said hydrazine thruster and said heat sink is clamped between said chamber housing and said support means.

11. The method of producing hot gas at steady pressure from a hydrazine catalyst bed in a hydrazine chamber having an inlet portion, this method comprising the steps of:
supplying liquid hydrazine through a supply line to said inlet portion of said chamber for exothermic decomposition of the hydrazine on catalyst within the chamber; and
withdrawing sufficient heat from said inlet portion so that hydrazine is delivered as liquid from the hydrazine supply line into the chamber and so that that portion of the catalyst within said inlet portion is below the hydrazine saturation temperature.

12. The process of claim 11 wherein the step of withdrawing heat is accomplished by attaching a thermally conductive heat sink to said inlet portion of said chamber.

* * * * *